United States Patent [19]
Gustafson et al.

[11] Patent Number: 5,496,427
[45] Date of Patent: *Mar. 5, 1996

[54] PROCESS FOR MANUFACTURING AN ELONGATED ELECTROLUMINESCENT LIGHT STRIP

[75] Inventors: Thomas L. Gustafson, Southfield; Marc A. Brookman, Dearborn, both of Mich.

[73] Assignee: The Standard Products Company, Dearborn, Mich.

[*] Notice: The term of this patent shall not extend beyond the expiration date of Pat. No. 5,336,345.

[21] Appl. No.: 249,699

[22] Filed: May 26, 1994

Related U.S. Application Data

[63] Continuation of Ser. No. 16,123, Feb. 10, 1993, abandoned, which is a continuation-in-part of Ser. No. 668,862, Mar. 13, 1991, abandoned.

[51] Int. Cl.⁶ ..................................................... B29C 47/02
[52] U.S. Cl. ..................... 156/67; 156/244.12; 264/21; 313/506; 313/509; 313/512; 428/690; 428/917
[58] Field of Search ................. 156/67, 244.12; 313/506, 509, 572, 512; 428/619, 917; 445/24, 25; 264/21

[56] References Cited

U.S. PATENT DOCUMENTS

| | | |
|---|---|---|
| 2,650,169 | 8/1953 | Goldstein . |
| 3,136,676 | 6/1964 | Fisch . |
| 3,138,834 | 6/1964 | Shanok et al. . |
| 3,305,745 | 2/1967 | Clock et al. . |
| 3,350,553 | 10/1967 | Cline . |
| 3,375,131 | 3/1968 | Schmidt . |
| 3,395,058 | 7/1968 | Kennedy . |
| 3,456,043 | 7/1969 | Emery . |
| 3,547,516 | 12/1970 | Shanok et al. . |
| 3,610,917 | 10/1971 | Hunt . |
| 3,790,775 | 2/1974 | Rosenblatt . |
| 4,443,832 | 4/1984 | Kanamori et al. . |
| 4,494,326 | 1/1985 | Kanamori . |
| 4,551,363 | 11/1985 | Fenech . |
| 4,603,065 | 7/1986 | Mori et al. . |
| 4,646,208 | 2/1987 | Hayashi et al. . |
| 4,801,928 | 1/1989 | Minter . |
| 4,904,508 | 2/1990 | Madonia . |
| 4,916,008 | 4/1990 | Katayama et al. . |
| 4,956,031 | 9/1990 | Mori et al. . |
| 5,080,928 | 1/1992 | Klinedinst et al. . |

FOREIGN PATENT DOCUMENTS 3543847  6/1987  Germany .

Primary Examiner—Michele K. Yoder
Attorney, Agent, or Firm—Harness, Dickey & Pierce

[57] ABSTRACT

An elongated electroluminescent light strip is provided. The electroluminescent light strip includes a lighting element which includes a phosphor matrix layer. The lighting element or lamp is encapsulated in a moisture impervious material. A process for manufacturing an elongated electroluminescent light strip is also provided.

10 Claims, 6 Drawing Sheets

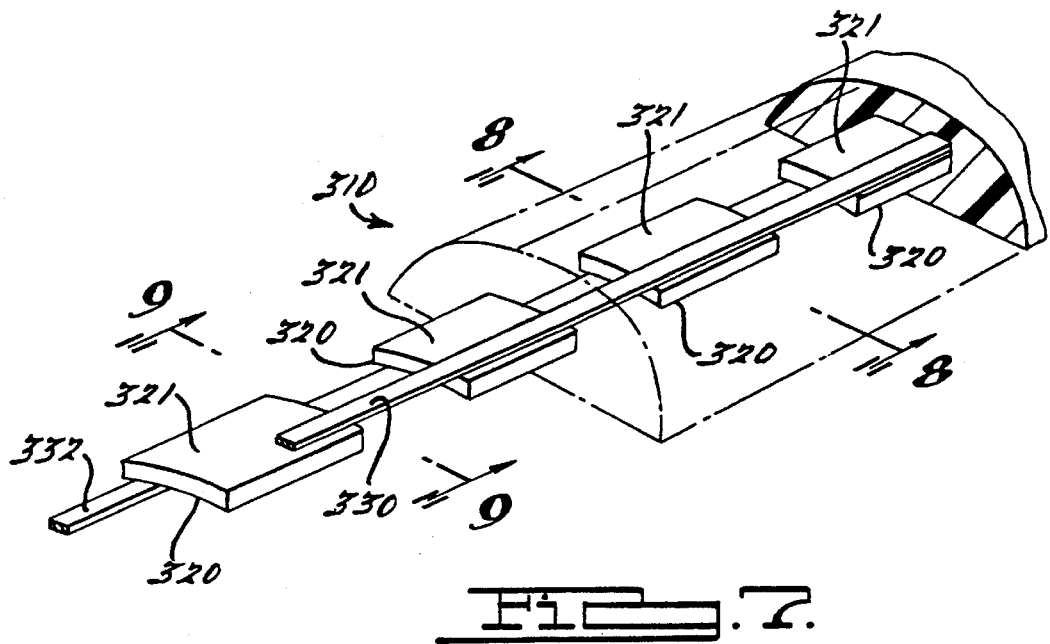
FIG. 7.
FIG. 8.
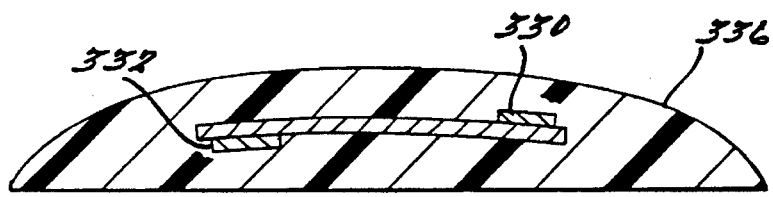
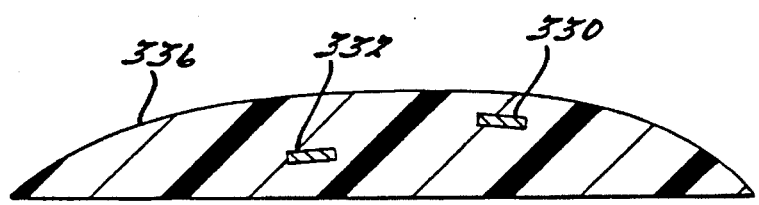
FIG. 9.

PROCESS FOR MANUFACTURING AN ELONGATED ELECTROLUMINESCENT LIGHT STRIP

CROSS-REFERENCE TO RELATED APPLICATIONS

This is a continuation of U.S. patent application Ser. No. 08/016,123, filed Feb. 10, 1993, which has been expressly abandoned, which is a continuation-in-part of U.S. application Ser. No. 668,862 filed Mar. 13, 1991, now abandoned.

BACKGROUND OF THE INVENTION

The present invention relates to an elongated electroluminescent light strip and to a continuous process for making such a strip. More particularly, the present invention relates to elongated electroluminescent light strips useful as moldings for vehicles and as building pathway and other light marking strips and to a continuous method of making such strips.

Electroluminescent lights have been known for many years and have been made by using conventional sheet lamination techniques to make a laminate structure of layers of a phosphor matrix sandwiched between electrically conductive layers. Typically, the electrically conductive layers include an aluminum foil layer and a conductive transparent sheet such as a layer of indium tin oxide. The foil can be insulated from the phosphor matrix by a dielectric coating. The electroluminescent lighting or lamp is often covered with a transparent moisture barrier film such as a polychlorotrifluoroethylene film.

Recently there has been development of electroluminescent technology for backlighting instruments and computer screens and for ornaments for vehicles. Three recent U.S. patents employing electroluminescent lamps in association with vehicles are U.S. Pat. Nos. 4,443,832 Apr. 17, 1984 to Kanamori et al. for "Self-illuminating Ornament for Vehicles; 4,494,326 Jan. 22, 1985 to Kanamori for "Electroluminescent Display Structure for Motor Vehicle Window" and 4,603,065 Jul. 29, 1986 to Mori et al. for "Decorative Part." An elongated electroluminescent light strip has also been developed and is disclosed in U.S. Pat. No. 3,161,797 Dec. 15, 1964 to Butter et al. for "Electroluminescent Device."

Conventional electroluminescent light techniques have encountered several problems. The phosphor matrix is extremely sensitive to moisture and one problem encountered in electroluminescent lamp construction relates to the destructive effect water vapor has on the phosphor layer. In a conventional laminate construction, a desiccant layer is sometimes used along with protective films having low vapor transmission rates to increase the longevity of the life of the phosphor matrix. The prevention of moisture encroachment into the lamp's interior is of paramount importance in electroluminescent light construction. This is especially true with the electroluminescent lamps sealed in an Aclar envelope. Typically, the Aclar electroluminescent lamps have wire leads which provide a place for moisture to enter the lamp.

Conventional lights are generally made of relatively thin construction with the protection film having edges either adhesively bonded or thermally fused using high pressure rollers. The thin protection film provides marginal protection against moisture ingress and high pressure rollers, i.e., conventional sheet lamination techniques, can damage the thin, fragile layers of the electroluminescent light. Conventional lamination techniques also, of course, can lead to wrinkles which are unsightly and can lead to moisture ingress into the light's interior. Thermally fusing leads to another problem, i.e., possibly damaging the phosphor matrix by excessively heating it. Another problem generally encountered in lamp construction relates to the relatively fragile nature of the various layers and of the lamp itself. Traditionally electroluminescent lights have been constructed to be as thin as possible and hence have had little inherent structural integrity. The electrically conductive layers are subject to damage during processing and, if wires are incorporated into the light, they tend to damage the other layers during manufacture of the light.

Thus, there remains a need for an improved electroluminescent light strip and for an improved continuous process for making an elongated electroluminescent light strip. In particular, there remains a need for an improved process in which the moisture sensitive electroluminescent lamp is well protected from the environment and which provides an electroluminescent lamp having good structural integrity. Also, as will be apparent to those skilled in the art, it would be desirable to have an economical, continuous process for making an elongated electroluminescent light strip.

SUMMARY OF THE INVENTION

The present invention relates to an extruded elongated electroluminescent light strip comprising an electroluminescent lamp with a pair of longitudinally extending bus strips encapsulated by a polymeric extrudate having a profile cross-sectional shape sealing the electroluminescent lamp and bus strips. Preferred embodiments of the electroluminescent light strip include an insert in a body side molding for an automotive vehicle or a pathway light strip. Another preferred embodiment is a light strip having a plurality of lamp elements spaced longitudinally along the strip and well sealed therein. In accordance with the method of the present invention, an electroluminescent light strip is made by encapsulating an electroluminescent lamp or lamp elements by extruding a polymeric plastic material preferably having a low vapor transmission rate about the lamp or lamp elements.

BRIEF DESCRIPTION OF THE DRAWINGS

FIG. 6 is a schematic view illustrating the process of the present invention;

FIG. 7 is a perspective view, partially in cross-section and broken away showing yet another preferred embodiment of an electroluminescent light strip of the present invention having spaced lamp elements and suitable, for example, for emergency pathway lighting;

FIG. 8 is a cross-sectional view taken along line 8—8 in FIG. 7;

FIG. 9 is a cross-sectional view taken along line 9—9 in FIG. 7;

DESCRIPTION OF THE INVENTION

Figure 1:
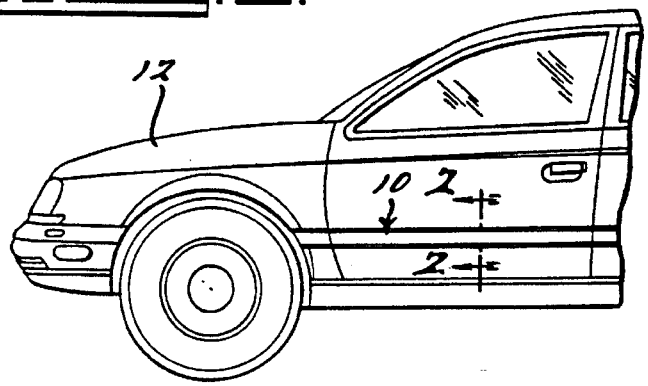
FIG. 1 is an elevational view, broken away, of an automotive vehicle with a preferred embodiment of the present invention mounted thereon as a body side molding.
Figure 2:
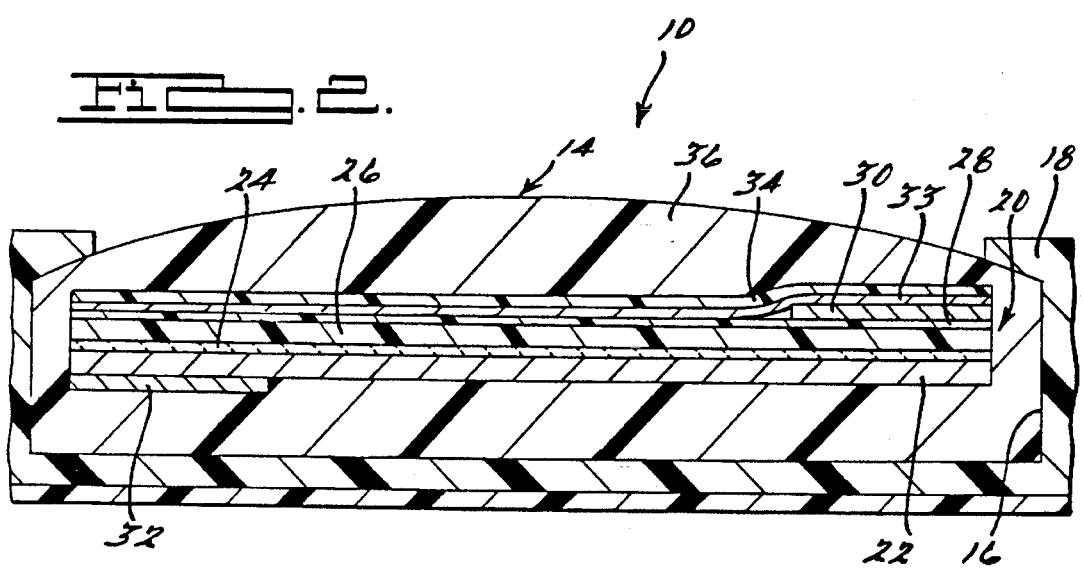
FIG. 2 is a sectional view taken along line 2—2 in FIG. 1.
Figure 3:
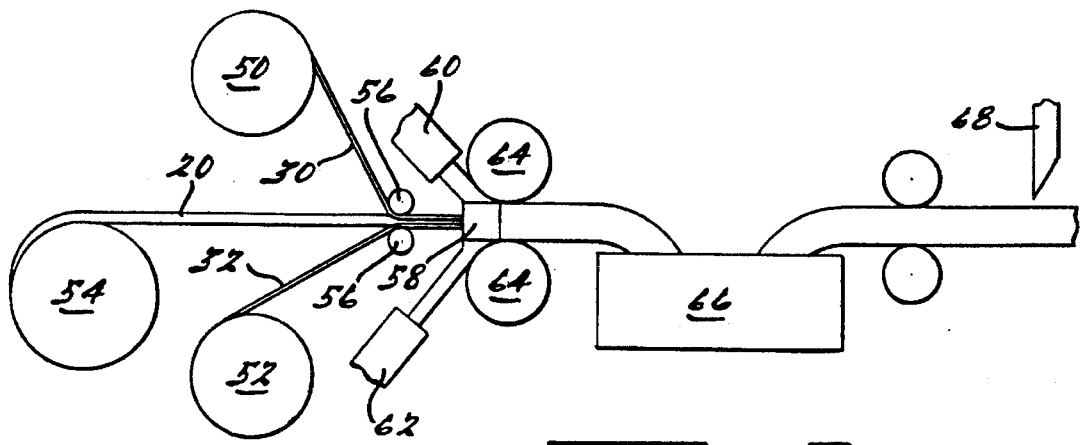
FIG. 3 is a perspective view partially in cross-section and broken away illustrating an insert of the body side molding of FIGS. 1 and 2.
Figure 3:
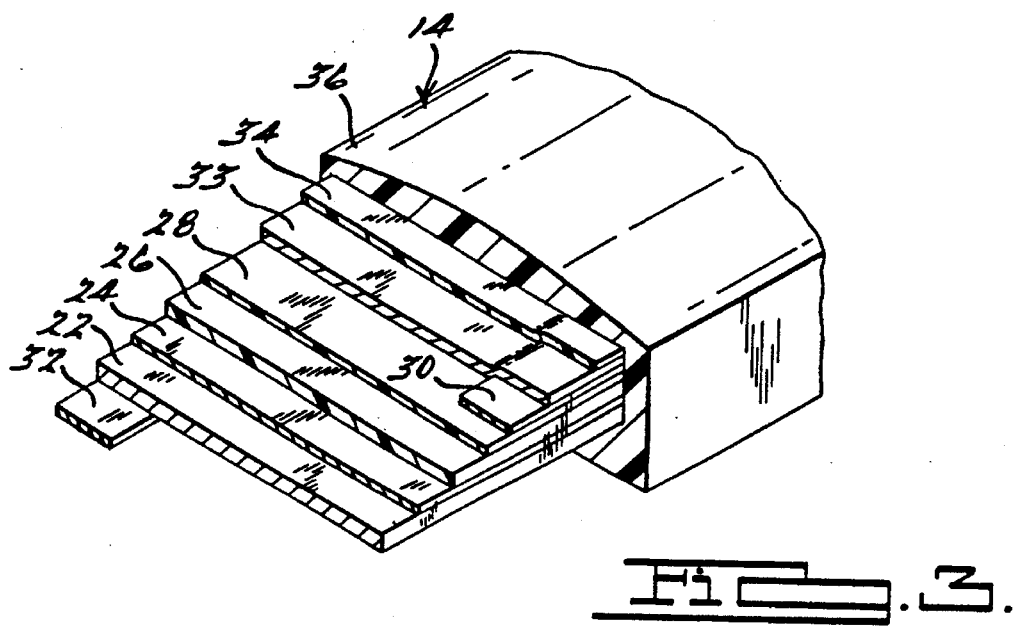

Now referring to the Figures, a preferred embodiment of the present invention is shown in FIG. 1 as a body side molding 10 on automotive vehicle 12. As best shown in FIG. 2, molding 10 broadly comprises elongated electroluminescent (hereinafter, "EL") light insert strip 14, snappingly held within channel 16 of base 18 of body side molding 10.

EL light insert strip 14 comprises an electroluminescent lamp 20 (hereinafter, "EL") which has a laminate structure of layers of aluminum foil base electrode 22, dielectric coating 24 comprising barium titanate, phosphor matrix layer 26, and transparent conductive layer 28 comprising indium tin oxide.

Preferably, the phosphor matrix layer is made from phosphor which is coated to become moisture resistant. For example, the phosphors may be coated with hydrolyzed alkylaluminum which desensitizes the phosphors to atmospheric moisture. All or part of an inert fluidized gas, such as nitrogen or argon, is passed through a bubbler containing trimethylaluminum heated to a temperature high enough to produce an equilibrium vapor pressure sufficient to yield the desired coating rate. The fluidized bed is heated to a temperature between about 150° to about 250° C. during the heating process.

The trimethylaluminum is hydrolyzed by reacting the gaseous water vapor. The inert gas stream is passed through a water filled bubbler before entering the fluidized bed. The temperature of the water bubbler and the flow rate of the inert gas can be controlled so that only enough water to fully react all of the trimethylaluminum molecules is used. When the desired thickness of hydrolyzed trimethylaluminum has been coated on the phosphor particles, the reaction is discontinued, the coated phosphor particles are removed and the phosphor matrix layer is formed by known methods. The phosphors utilized for carrying out the hydrolization process generally are commercially available. One such phosphor is ZnS:Cu EL phosphor type 723 available from Sylvania.

Typically, the first bus strip 30 extends longitudinally along conductive layer 28 and is in electrical contact therewith. Second bus strip 32 extends longitudinally along base electrode 22 and is in electrical contact therewith. This ensures consistent electric potential along the length of EL lamp 20 and thereby provides even light color and intensity. Optionally, an additional coating of conductive ink can be used to enhance the conductivity between bus strip 30 and conductive layer 28. EL lamp 20 functions in the known manner for conventional electroluminescent lights.

In the embodiments herein bus strips 30 and 32 are shown as rectangular cross-section copper bars. However, conventional round copper wire or other elongate conductors could be utilized as bus strips in the process and articles of the present invention.

To enhance the appearance of molding 10 during daylight hours, EL lamp 20 may be provided with a semi-transparent overlayer of metalized film. For example, a polyester film 34 having a thin layer 33 of aluminum vacuum deposited on one side is suitable. Metalized film 34 preferably has about 50% light transmission and about 50% light reflectance.

EL lamp 20 and metalized film 34 are completely encapsulated by a moisture resistant extrudate cover 36 to provide EL light insert strip 14. Cover 36 is continuous around EL lamp 20 and metalized film 34 except for the longitudinal ends of bus strips 30 and 32 as described further hereinafter. In a highly preferred embodiment cover 36 comprises a low vapor transmission rate polymeric material such as Surlyn®, an ionomer resin, high density polyethylene, or polychlorotrifluoroethylene. It is also contemplated that other polymeric materials having somewhat higher vapor transmission rates such as polyvinylchloride could also be utilized.

Figure 4:
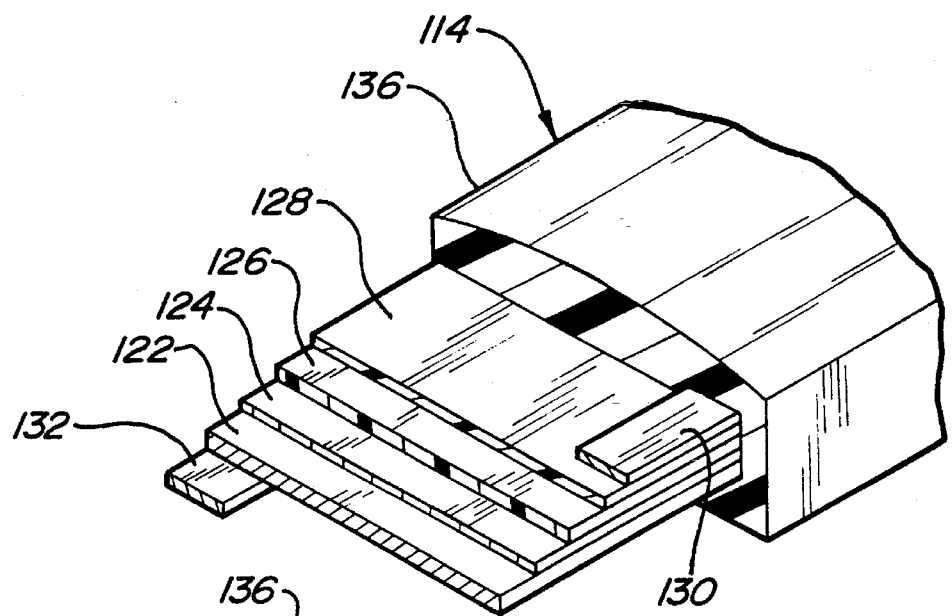
FIG. 4 is a perspective view partially in cross-section and broke away illustrating an alternative preferred embodiment of the present invention.
Figure 13:
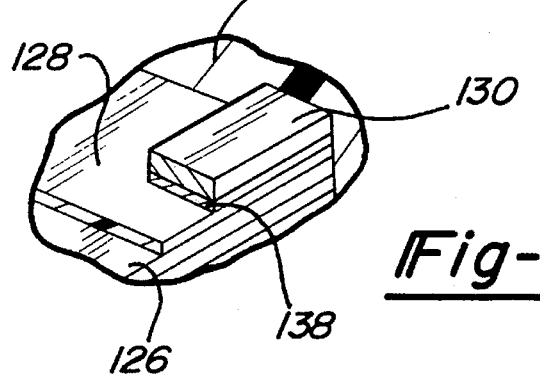
FIG. 13 is a cross-sectional view showing an alternative preferred embodiment similar to the embodiment of FIG. 4.

Referring to FIG. 4 there is shown an alternative embodiment of an electroluminescent light strip 114 which has an EL lamp encapsulated therein. The lamp includes an aluminum foil base electrode 122, dielectric coating 124 comprising barium titanate, a phosphor matrix layer 126 having an indium tin oxide layer 128 and first and second bus strips 130 and 132. The phosphor matrix layer is prepared in the same manner as described with reference to FIG. 1. Again, the EL light strip 114 is formed by encapsulating EL lamp in low vapor transmission rate extrudate in a manner analogous to EL lamp 20. As shown more clearly in FIG. 13 the embodiment of FIG. 4 can be provided with a layer of silver conductive ink 138 to enhance conductivity. Typically, this layer of silver conductive ink is disposed on the indium tin oxide layer immediately beneath bus strip 130.

Figure 5:
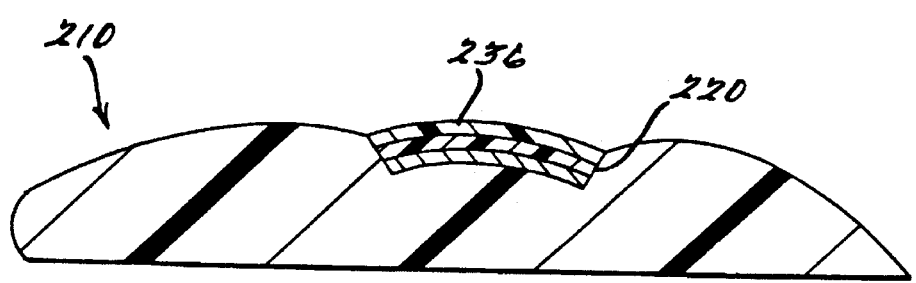
FIG. 5 is a cross-sectional view similar to FIG. 2 but showing another alternative preferred embodiment of the present invention.

Now referring to FIG. 5, yet another embodiment of the present invention is shown and indicated generally by the numeral 210. Strip 210 comprises an EL lamp of construction analogous to that of EL lamp 20 and indicated generally by the numeral 220. EL lamp 220 is encapsulated by extrudate 236 which is adhesively or fusion bonded into body 218 to provide strip 210. The EL light of this embodiment is electrified by conventional means such as electrodes on either end. The elongate strip is manufactured by an extrusion process as described further hereinafter for fully encapsulating the EL element from moisture.

Now referring to FIG. 6, a dual extrusion method for making an EL light strip of the present invention is schematically illustrated. Thus, first lower bus strip 30 is fed from roll 50, second bus strip 32 is fed from roll 52, joined with EL lamp 20 from roll 54 and passed between feeder rolls 56 and then through die 58 where extruders 60 and 62 provide encapsulating body 36 thereon. The strip is passed between shaping rollers 64 and then cooled in a cooling tank 66. The zone temperature profile for extruding surlyn ranges from 150° C. (302° F.) to 230° C. (446° F.). The preferred die temperature is around 200° C. (390° F.). In a dual forming approach the lower and upper extrudate are each individually profiled as they exit the dies at a temperature of approximately 180° C. The distance traversed to the forming rolls can be varied to allow for cooling adjustment which can vary with the mass of the profiled extrudate. A benefit of the dual extrusion approach is that the extrudates can be final formed through the forming rolls. This allows for the extrudates to breathe. That is, when the lamp is intruded into the extrusion the material displacement can be controlled by the forming rolls. Excess material can be vented to the side and trimmed. The result is a process which has very low pressure exerted on the surface of the lamp foil and does not drive the bus through the fragile lamp layers causing a short and also allows for some particle contamination without shorting out the lamp foil. Then the strip is cut into desired lengths by cut-off blade 68 for shipping and/or storage. Because of the sensitivity of the EL light to moisture and the like the EL light must be integrated in the strip by utilizing an environmentally controlled chamber or the like in the process. The EL lamp itself can be profiled so that the lamp can be arced, bent and injected between the two extrudates without losing form. Therefore the geometry of the lamp can be controlled independent of the geometry of the extrudates. A cross-head extrusion can also be used to provide encapsulating body 36 about EL lamp 20.

The above process may be accomplished by providing a feed horn (not shown) from an environmentally controlled chamber containing the EL lamp stock. A pair of tubes are provided immediately on the upper and lower sides of the feed horn for guiding of the bus strips 30 and 32. The feed horn is placed immediately adjacent the extruder and the EL lamp, bus strips and extruded strips are pulled through the extruder with chrome pinch type rollers for providing the continuous extruding process.

In order to electrically connect the EL light, the ends of EL insert 14 are cut, then encapsulating body 36 is stripped away from upper and lower bus strips 30 and 32. The bus strips are then connected to the desired sources of electricity.

Referring now to FIGS. 7 through 9, there is shown an alternate embodiment of an electroluminescent light strip 314 which has spaced EL lamp elements and has advantages in installations in the field. It has been problematic in the past that should an electroluminescent light need replacement it was sometimes necessary to access the electrical connections. During this process the EL light element of prior art structures might be exposed to moisture which would make the light inoperable. In this embodiment of the present invention this problem is solved in that suitable locations are provided for cutting and splicing of the wires while maintaining the EL light element in a moisture protected environment.

In accordance with this embodiment of the present invention, the strip 314 includes spaced EL lamp elements 320 which are encapsulated in a low vapor transmission rate polymeric extrudate 336. Lamp elements 320 are commonly electrically connected to first and second bus strips 330 and 332.

As shown in FIG. 9, the lamps are individually sealed in the polymer encapsulation material 336 such that they are isolated from one another. This allows the field installer the opportunity to cut the strip to a desired length between any pair of lamps and strip the encapsulating material from the bus strips at these locations without exposing any EL lamp materials to the environment.

As will be appreciated the length and the spacing of the lamps therebetween can be set up in any desired lengths which may be necessary in a particular application. The strips would be useful in trim strip applications for walkway markers or roadway markers and the like. Thus, the top surface 321 of each lamp element 320 can be provided with indicia or other markings.

Figure 10:
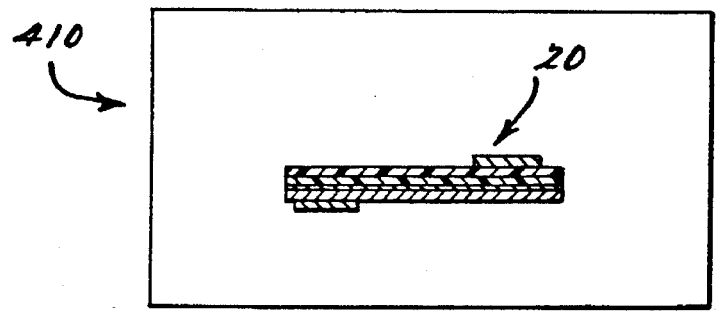
FIGS. 10–12 are each cross-sectional views similar to FIG. 2 but showing further alternative preferred embodiments of the present invention.
Figure 11:
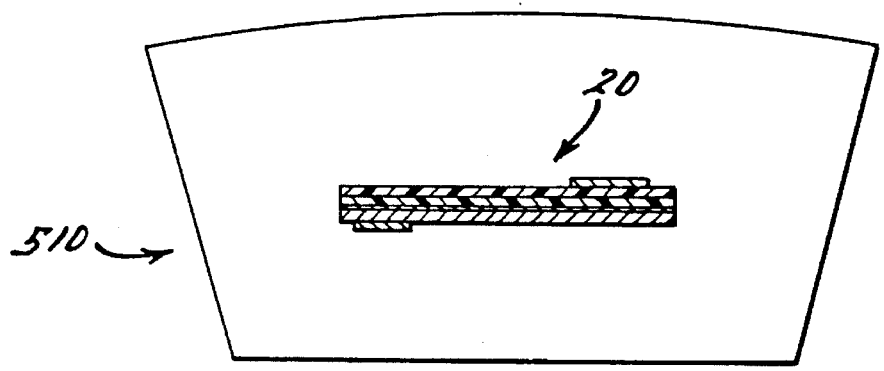
Figure 12:
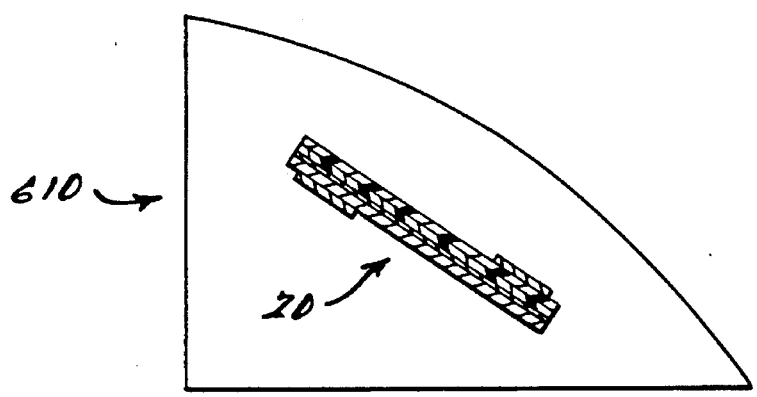

Further alternative preferred embodiments of the present invention are shown in FIGS. 10–12 which illustrate identical EL lamps 20 encapsulated in extrudates of different cross-sectional shapes. Thus, molding 410 has a rectangular cross-sectional shape, molding 510 has a bowed cross-sectional shape and molding 61 0 has a shape suitable for a corner molding.

Figure 14:
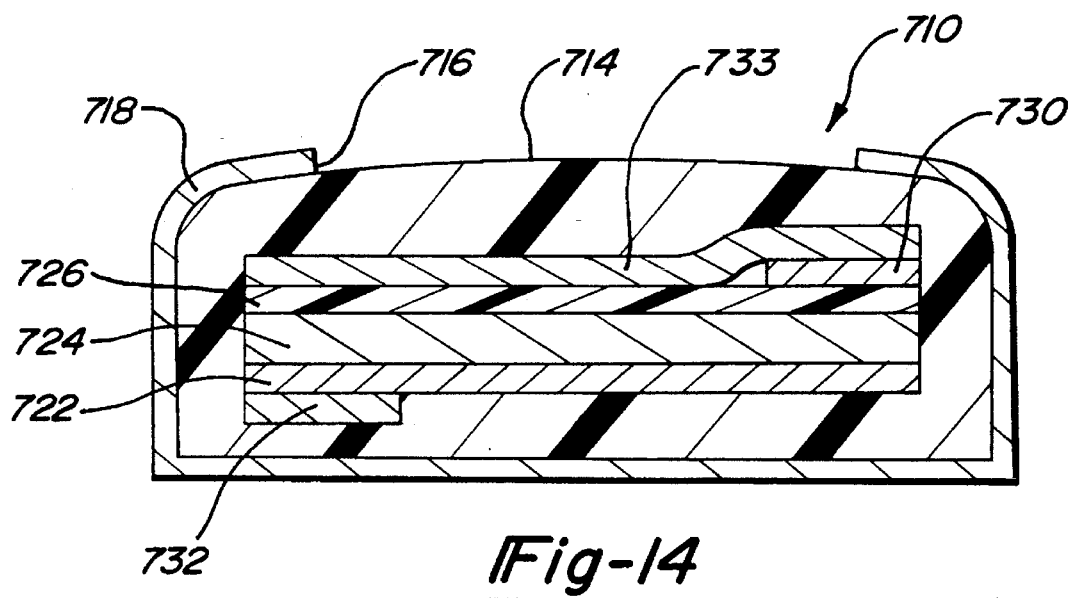
FIG. 14 is a cross-sectional view showing another alternative preferred embodiment of the present invention.

FIG. 14 illustrates yet another preferred embodiment of the present invention. The molding 710 comprises elongated electroluminescent light insert strip 71 4 held within channel 71 6 of base 71 8. The electroluminescent light insert strip 71 4 includes an electroluminescent lamp which has a laminate structure of layers of an aluminum foil base electrode 722, dielectric coating 724 comprising barium titanate, phosphor matrix layer 726 and metalized layer 733 comprising indium tin oxide. The first bus strip 730 extends longitudinally along the phosphor matrix layer 726 and in electrical contact therewith. Second bus strip 732 extends longitudinally along base electrode 722 and is in electrical contact therewith. This ensures consistent electrical potential along the length of EL lamp 720 and thereby provides even light color and intensity.

Figure 15:
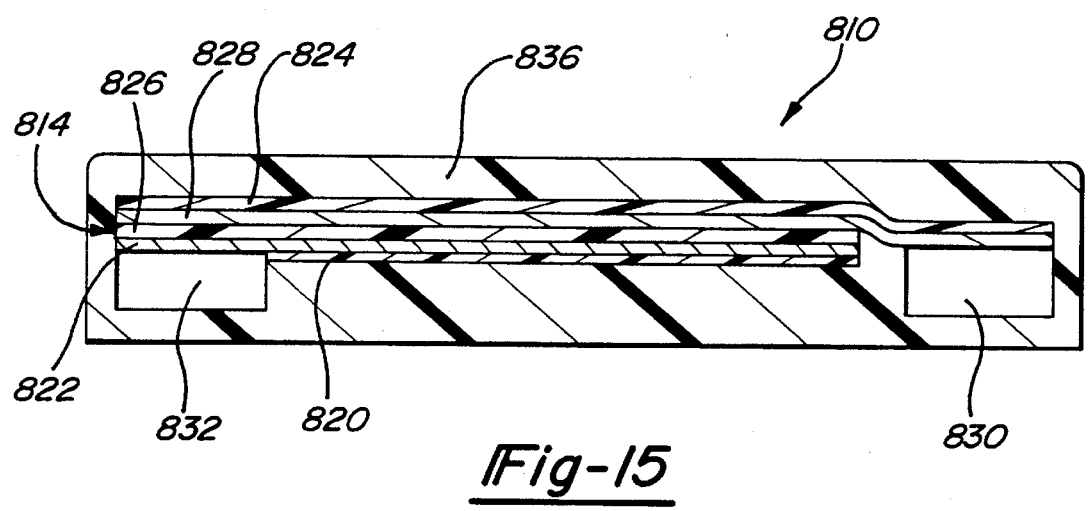
FIG. 15 is a sectional end view illustrating another alternative preferred embodiment of the present invention.

FIG. 15 illustrates still another preferred embodiment of the present invention. The molding 810 comprises an elongated electroluminescent light insert 814 and an elastomeric coating 836. The electroluminescent light insert 814 includes a base polyester film layer 820 and an adjacent electrode 822 formed from a conductive material such as indium tin oxide, indium oxide, carbon or silver among others. Adjacent the conductive electrode 822 is a phosphor matrix layer 826 screen printed onto the conductive electrode 822 with a segment of the phosphor matrix layer being left exposed or cut-away to allow the bus strip 832 to contact conductive layer 828. The clear conductive layer 628 typically consist of indium oxide or indium tin oxide which is screen printed onto the phosphor matrix layer 826 with an insulative layer 824 being screen printed onto the clear conductive layer.

Alternatively, the two conductive layers 822 and 828, respectively, can be reversed such that the light emitting side projects through the polyester film with the conductive screen printed layer 828 being applied as the outermost layer adjacent the insulating layer.

It will be understood by those skilled in the art that the overall shape of the electroluminescent light strips of the present invention will be dictated by the shape of the extrudate dies, Essentially, any shape which effectively encapsulates the electroluminescent light strips is possible.

While it will be apparent that the preferred embodiments of the invention disclosed are well calculated to fulfill the objects stated, it will be appreciated that the invention is susceptible to modification, variation and change without departing from the spirit thereof.

What is claimed is:

1. A process for the manufacture of an elongated electroluminescent light strip comprising the steps of:

a) feeding an elongated electroluminescent lamp which includes an electrically conductive layer, a substantially moisture resistant phosphor matrix layer including a coating Of hydrolyzed trimethylaluminum and spaced apart bus strips, wherein said bus strips extend from said electroluminescent lamp to an extruder; and b) encapsulating the elongated electroluminescent lamp in an extrudate by continuously extruding a polymeric material about said electroluminescent lamp to fully encapsulate said electroluminescent lamp.

2. The process according to claim 1, further comprising the step of positioning said bus strips along the entire length of the electroluminescent lamp one on each side of said electrically conductive and phosphor matrix layers for electrically energizing the electroluminescent lamp along substantially the entire length of the electroluminescent lamp.

3. The process of claim 1, comprising the further step of interposing a layer of semi-transparent metalized film over said phosphor matrix layer prior to the encapsulating step.

4. The process of claim 1, wherein said elongated electroluminescent light strip is provided with individual spaced apart electroluminescent lamp segments such that said electroluminescent light strip is selectively divisible into smaller strips.

5. The process of claim 1, comprising the further step of interposing a layer of semi-transparent film over said electroluminescent lamp prior to the encapsulating step.

6. The process of claim 1, comprising the further step of passing the electroluminescent lamp and extrudate between shaping rollers.

7. A process for the manufacture of an elongated electroluminescent light strip comprising the steps of:

(a) forming an elongated electroluminescent lamp including an electrically conductive layer, a phosphor matrix layer which is coated with hydrolyzed trimethylaluminum disposed along one side against said electrically conductive layer, a second electrically conductive layer disposed along a second side of said phosphor matrix layer and a pair of spaced apart bus strips, said bus strips being disposed such that one bus strip is in contact with each electrically conductive layer, wherein said bus strips extend from the electroluminescent lamp to an extruder; and (b) encapsulating the elongated electroluminescent lamp in an extrudate by continuously extruding a polymeric material about said electroluminescent lamp to fully encapsulate said electroluminescent lamp.

8. The process of claim 7, comprising the further step of interposing a layer of semi-transparent film over said electroluminescent lamp prior to the encapsulating step.

9. The process of claim 7, wherein said elongated electroluminescent light strip is provided with individual spaced apart electroluminescent lamp segments such that said electroluminescent light strip is selectively divisible into smaller strips.

10. The process of claim 7, further comprising the step of passing the electroluminescent lamp and extrudate between shaping rollers.

\* \* \* \* \*